(12) United States Patent
Liu

(10) Patent No.: US 11,770,781 B2
(45) Date of Patent: Sep. 26, 2023

(54) METHOD AND DEVICE FOR INDICATING PERIOD INFORMATION OF COMMON CONTROL RESOURCE SET OF REMAINING KEY SYSTEM INFORMATION

(71) Applicant: KONINKLIJKE PHILIPS N.V., Eindhoven (NL)

(72) Inventor: Yang Liu, Beijing (CN)

(73) Assignee: Koninklijke Philips N.V., Eindhoven (NL)

(*) Notice: Subject to any disclaimer, the term of this patent is extended or adjusted under 35 U.S.C. 154(b) by 27 days.

(21) Appl. No.: 16/762,657

(22) PCT Filed: Nov. 15, 2017

(86) PCT No.: PCT/CN2017/111084
§ 371 (c)(1),
(2) Date: May 8, 2020

(87) PCT Pub. No.: WO2019/095140
PCT Pub. Date: May 23, 2019

(65) Prior Publication Data
US 2020/0280938 A1    Sep. 3, 2020

(51) Int. Cl.
*H04W 56/00* (2009.01)
*H04W 72/0453* (2023.01)
(Continued)

(52) U.S. Cl.
CPC ..... *H04W 56/001* (2013.01); *H04W 72/0453* (2013.01); *H04W 72/30* (2023.01); *H04W 72/53* (2023.01)

(58) Field of Classification Search
None
See application file for complete search history.

(56) References Cited

U.S. PATENT DOCUMENTS

| 10,728,916 B2 | 7/2020 | Ly et al. |
| 2010/0124919 A1 | 5/2010 | Ko et al. |

(Continued)

FOREIGN PATENT DOCUMENTS

| CN | 101300802 A | 11/2008 |
| CN | 101395830 A | 3/2009 |

(Continued)

OTHER PUBLICATIONS

ZTE, "Remaining details of RMSI", 3GPP TSG RAN WG1 Meeting NR#3, R1-1715378, dated Sep. 2017, all pages. (Year: 2017).*

(Continued)

*Primary Examiner* — Srinivasa R Reddivalam

(57) ABSTRACT

A method for indicating period information of a common control resource set (CORESET) of remaining key system information (RMSI), includes: adding indication information to a physical broadcast channel (PBCH) of a synchronous broadcast block (SSB), wherein the indication information includes first indication information, and the first indication information is used for indicating a positional relationship between a half radio frame where a CORESET of RMSI corresponding to the SSB is located and a half radio frame where the SSB is located; and sending, in a beam scanning manner, the SSB carrying the indication information to user equipment (UE).

17 Claims, 4 Drawing Sheets

---

Receive an SSB carrying indication information from a base station, where the indication information includes first indication information used for indicating a positional relationship between a half radio frame where a CORESET of RMSI corresponding to the SSB is located and a half radio frame where the SSB is located — S201

Obtain a half radio frame where the CORESET of the RMSI is located according to the half radio frame where the SSB is located and the first indication information — S202

Search for the CORESET of the RMSI in the half radio frame where the CORESET of the RMSI is located — S203

(51) Int. Cl.
*H04W 72/30* (2023.01)
*H04W 72/53* (2023.01)

(56) References Cited

U.S. PATENT DOCUMENTS

| | | | |
|---|---|---|---|
| 2013/0275400 A1 | 10/2013 | Rus et al. | |
| 2015/0103715 A1 | 4/2015 | Chen et al. | |
| 2015/0103777 A1 | 4/2015 | Chen et al. | |
| 2015/0201249 A1 | 7/2015 | Ryu et al. | |
| 2017/0339683 A1 | 11/2017 | Chen et al. | |
| 2018/0049203 A1 | 2/2018 | Xue et al. | |
| 2018/0098361 A1 | 4/2018 | Ji et al. | |
| 2019/0053293 A1 | 2/2019 | Akoum et al. | |
| 2019/0089474 A1* | 3/2019 | Ly | H04B 7/0695 |
| 2019/0123992 A1* | 4/2019 | Ly | H04W 24/10 |
| 2019/0159264 A1 | 5/2019 | Zhang et al. | |
| 2020/0045672 A1* | 2/2020 | Yang | H04L 5/0094 |
| 2020/0059911 A1 | 2/2020 | Tang et al. | |
| 2020/0162217 A1 | 5/2020 | Liu et al. | |
| 2020/0178253 A1* | 6/2020 | Gao | H04W 72/005 |
| 2020/0220691 A1 | 7/2020 | Gao et al. | |
| 2020/0228275 A1 | 7/2020 | Li et al. | |
| 2020/0296656 A1 | 9/2020 | Amuru et al. | |
| 2020/0314776 A1* | 10/2020 | Harada | H04W 48/12 |
| 2020/0344097 A1* | 10/2020 | Si | H04W 72/0453 |

FOREIGN PATENT DOCUMENTS

| | | |
|---|---|---|
| CN | 101453243 A | 6/2009 |
| CN | 102007808 A | 4/2011 |
| CN | 101578902 B | 6/2012 |
| CN | 103931254 A | 7/2014 |
| CN | 105612801 A | 5/2016 |
| CN | 106851840 A | 6/2017 |
| CN | 107278383 A | 10/2017 |
| EP | 2 787 671 A1 | 10/2014 |
| EP | 3694283 A1 | 8/2020 |
| RU | 2428815 C2 | 9/2011 |
| RU | 2602808 C1 | 11/2016 |
| WO | WO 2014/162568 A1 | 10/2014 |
| WO | WO 2017/052458 A1 | 3/2017 |

OTHER PUBLICATIONS

3GPP TR 38.811 V0.1.0 (Jun. 2017); 3rd Generation Partnership Project; Technical Specification Group Radio Access Network; Study on New Radio (NR) to support Non Terrestrial Networks (Release 15); http://www.3gpp.org., 22 pages.
Huawei et al. NR-PBCH Contents and Payload Size. 3GPP TSG RAN WG1 Meeting #90, R1-1712143, Prague, Czech Republic, Aug. 21-25, 2017, 7 pages.
Nokia et al. Remaining Details on NR-PBCH. 3GPP TSG-RAN WG1 Meeting 90bis, R1-1718612, Prague, Czech Republic, Oct. 9-13, 2017, 6 pages.
VIVO. Remaining Aspects on NR-PBCH Contents and Payload. 3GPP TSG RAN WG1 NR Ad-Hoc#3. R1-1715607, Nagoya, Japan, Sep. 18-21, 2017, 6 pages.
NTT DOCOMO et al. Draft LS on NR Initial Access and Mobility. 3GPP TSG RAN Wg Meeting #90, R1-1715259, Prague, Czech Republic, Aug. 21-25, 2017, 7 pages.
English translation of Written Opinion of the International Search Authority in International Application No. PCT/CN2017/111084, dated Aug. 3, 2018.
International Search Report in International Application No. PCT/CN2017/111084, dated Aug. 3, 2018.
CATT, "Offline summary for AI 7.1.2.2 Remaining details on Remaining Minimum System Information", 3GPP TSG RAN WG1 Meeting 90bis, R1-1719145, Prague, CZ, Oct. 9-13, 2017, 15 pages.
CATT, "Remaining details on RMSI", 3GPP TSG RAN WG1 Meeting 90bis, R1-1717799, Prague, CZ, Oct. 9-13, 2017, 6 pages.
First Office Action of Chinese Application No. 201780001841.6, dated Apr. 14, 2021.
MCC Support: "Final Report of 3GPP TSG RAN WG1 #AH_NR3 V1.0.0", 3GPP TSG RAN WG1 Meeting #90bis, R1-1716942, Prague, Czech Rep, Oct. 9-13, 2017, 104 pages.
MCC Support: "Final Report of 3GPP TSG RAN WG1 #AH_NR2 V1.0.0", 3GPP TSG RAN WG1 Meeting #90, R1-1712032, Prague, Czech Rep, Aug. 21-25, 2017, 109 pages.
NTT DOCOMO, Inc., "Discussion on remaining details on NR-PBCH and PBCH-DMRS", 3GPP TSG RAN WG1 Meeting 90bis, R1-1718180, Prague, CZ, Oct. 9-13, 2017, 15 pages.
QUALCOMM Incorporated: "Remaining details on NR-PBCH", 3GPP TSG RAN WG1 Meeting NR#3, R1-1716379, Nagoya, Japan, Sep. 18-21, 2017, 5 pages.
Extended European Search Report in European Application No. 17932403.3, dated Jun. 21, 2021.
Qualcomm Incorporated, "Remaining System Information Delivery Consideration", 3GPP TSG RAN WG1 Meeting 90bis, R1-1718528, Oct. 13, 2017.
CATT, "Offline summary for A1 7.1.2.2 Remaining details on Remaining Minimum System Information", 3GPP TSG RAN WG1 Meeting 90bis, R1-1718772, Oct. 13, 2017.
LG Electronics, "Discussion on search space design", 3GPP TSG RAN WG1 Meeting 90bis, R1-1717952, Oct. 13, 2017.
Intel Corporation, "Details on NR PBCH design", 3GPP TSG RAN WG1 Meeting RAN1 #89, R1-1707339, May 19, 2017.
International Search Report in International Application No. PCT/CN2017/110927, dated Aug. 7, 2018.
English translation of the Written Opinion of the International Search Authority in International Application No. PCT/CN2017/110927, dated Aug. 7, 2018.
First Office Action of Chinese Application No. 201780001912.2, dated Mar. 13, 2019.
First Office Action of Russian Application No. 2020118936, dated Sep. 30, 2020.
Notice of Allowance of Russian Application No. 2020118936, dated Dec. 3, 2020.
Nokia, Nokia Shanghai Bell, "Remaining details on NR-PBCH", 3GPP TSG-RAN WG1 NR AH#3, R1-1716524, Nagoya, Japan, Sep. 18-21, 2017.
NTT DOCOMO, Inc., "Discussion on remaining details on RMSI delivery", 3GPP TSG RAN WG1 Meeting 90bis, R1-1718181, Prague, CZ, Oct. 9-13, 2017.
Supplementary European Search Report in European Application No. 17932074.2, dated May 3, 2021.
Notice of Reasons for Refusal of Japanese Application No. 2020-543663, dated Jun. 15, 2021.
First Office Action of U.S. Appl. No. 16/862,544, dated Aug. 11, 2021.
Office Action of Indian Application No. 202047024595, dated Aug. 5, 2021.
International Search Report in International Application No. PCT/CN2017/111284, dated Aug. 13, 2018.
English translation of the Written Opinion of the International Search Authority in International Application No. PCT/CN2017/111284, dated Aug. 13, 2018.
VIVO, "Remaining Aspects on NR-PBCH contents and payload" 3GPP TSG RAN WG1 Meeting #90bis R1-1717460,Oct. 13, 2017.
NTT DOCOMO, Inc, "Discussion on remaining details on NR-PBCH and PBCH-DMRS", 3GPP TSG RAN WG1 Meeting NR#3, R1 -1716070, Sep. 21, 2017.
First Office Action of Chinese Application No. 201780001948.0, dated Nov. 4, 2020.
Office Action of U.S. Appl. No. 16/872,340, dated Oct. 25, 2021.
Notification of Reason for Refusal of Korean Application No. 10-2020-7016675, dated Sep. 20, 2021.

\* cited by examiner

METHOD AND DEVICE FOR INDICATING PERIOD INFORMATION OF COMMON CONTROL RESOURCE SET OF REMAINING KEY SYSTEM INFORMATION

CROSS REFERENCE TO RELATED APPLICATIONS

This application is a national phase application based on PCT/CN2017/111084, filed Nov. 15, 2017, the content of which is incorporated herein by reference.

TECHNICAL FIELD

The disclosure relates to the technical field of communication, and more particularly, to a method and device for indicating period information of a common control resource set (CORESET) of remaining key system information (RMSI), a method and device for searching for a CORESET of RMSI, a base station, user equipment (UE), and a computer-readable storage medium.

BACKGROUND

In the recent 3rd Generation Partnership Project (3GPP) discussion, it is proposed that how to indicate period information of a CORESET of RMSI in a physical broadcast channel (PBCH) is an important issue to be solved. Because the PBCH currently leaves only about 8 bits for indication information of the CORESET of the RMSI, in which one or two bits may need to be reserved for future use, it is a great challenge to how to indicate the period information of the CORESET of the RMSI in a broadband system. In addition, since merging of the PBCH in time domain is to be considered, the content of a bit of the PBCH, that is used to indicate a CORESET period, in a synchronous broadcast block (SSB) corresponding to each beam is required to be the same which further limits the freedom of indication for the CORESET of the RMSI in frequency domain and increases the indication difficulty.

SUMMARY

In view of this, the disclosure relates to a method and device for indicating period information of a CORESET of RMSI, a method and device for searching for a CORESET of RMSI, a base station, a UE, and a computer-readable storage medium, so as to indicate period information of a CORESET by using as few bits as possible.

According to a first aspect of embodiments of the disclosure, a method for indicating period information of a CORESET of RMSI is provided. The method may be applicable to a base station and include:

adding indication information to a PBCH of an SSB, the indication information including first indication information configured to indicate a positional relationship between a half radio frame where a CORESET of RMSI corresponding to the SSB is located and a half radio frame where the SSB is located; and sending the SSB carrying the indication information to UE in a beam scanning manner.

In an embodiment, the indication information may further include second indication information configured to indicate a magnitude relationship between a value of a period of the CORESET of the RMSI and a value of a period of the SSB.

In an embodiment, the first indication information may occupy one bit or two bits.

According to a second aspect of the embodiments of the disclosure, a method for searching for a CORESET of RMSI is provided. The method may be applicable to UE and include:

receiving an SSB carrying indication information from a base station, the indication information including first indication information configured to indicate a positional relationship between a half radio frame where a CORESET of RMSI corresponding to the SSB is located and a half radio frame where the SSB is located;

obtaining the half radio frame where the CORESET of the RMSI is located according to the half radio frame where the SSB is located and the first indication information; and searching for the CORESET of the RMSI in the half radio frame where the CORESET of the RMSI is located.

In an embodiment, the indication information may further include second indication information configured to indicate a magnitude relationship between a value of a period of the CORESET of the RMSI and a value of a period of the SSB.

In an embodiment, the first indication information may occupy one bit or two bits.

In an embodiment, the method may further include:

before obtaining the half radio frame where the CORESET of the RMSI is located according to the half radio frame where the SSB is located and the first indication information, obtaining the value of the period of the CORESET of the RMSI according to the value of the period of the SSB and the second indication information.

According to a third aspect of the embodiments of the disclosure, a device for indicating period information of a CORESET of RMSI is provided. The device may be applicable to a base station and include:

an addition module, configured to add indication information to a PBCH of an SSB, the indication information including first indication information configured to indicate a positional relationship between a half radio frame where a CORESET of RMSI corresponding to the SSB is located and a half radio frame where the SSB is located; and a sending module, configured to send the SSB carrying the indication information added by the addition module to UE in a beam scanning manner.

In an embodiment, the indication information may further include second indication information configured to indicate a magnitude relationship between a value of a period of the CORESET of the RMSI and a value of a period of the SSB.

In an embodiment, the first indication information may occupy one bit or two bits.

According to a fourth aspect of the embodiments of the disclosure, a device for searching for a CORESET of RMSI is provided. The device may be applicable to UE and include:

a receiving module, configured to receive an SSB carrying indication information from a base station, the indication information including first indication information configured to indicate a positional relationship between a half radio frame where a CORESET of RMSI corresponding to the SSB is located and a half radio frame where the SSB is located;

a first obtaining module, configured to obtain the half radio frame where the CORESET of the RMSI is located according to the half radio frame where the SSB is located and the first indication information that is carried in the SSB received by the receiving module; and a search module, configured to search for the CORESET of the RMSI in the half radio frame where the CORESET of the RMSI obtained by the first obtaining module is located.

In one embodiment, the indication information may further include second indication information configured to indicate a magnitude relationship between a value of a period of the CORESET of the RMSI and a value of a period of the SSB.

In one embodiment, the first indication information may occupy one bit or two bits.

In one embodiment, the device may further include:

a second obtaining module, configured to obtain, before the first obtaining module obtains the half radio frame where the CORESET of the RMSI is located according to the half radio frame where the SSB is located and the first indication information, the value of the period of the CORESET of the RMSI according to the value of the period of the SSB and the second indication information.

According to a fifth aspect of the embodiments of the disclosure, a base station is provided, which may include:

a processor; and a memory configured to store instructions executable by the processor.

The processor may be configured to:

add indication information to a PBCH of an SSB, the indication information including first indication information configured to indicate a positional relationship between a half radio frame where a CORESET of RMSI corresponding to the SSB is located and a half radio frame where the SSB is located; and send the SSB carrying the indication information to a UE in a beam scanning manner.

According to a sixth aspect of the embodiments of the disclosure, UE is provided, which may include:

a processor; and a memory configured to store instructions executable by the processor.

The processor may be configured to:

receive an SSB carrying indication information from a base station, the indication information including first indication information configured to indicate a positional relationship between a half radio frame where a CORESET of RMSI corresponding to the SSB is located and a half radio frame where the SSB is located;

obtain the half radio frame where the CORESET of the RMSI is located according to the half radio frame where the SSB is located and the first indication information; and search for the CORESET of the RMSI in the half radio frame where the CORESET of the RMSI is located.

According to a seventh aspect of the embodiments of the disclosure, a computer-readable storage medium is provided. The computer-readable storage medium may store computer instructions that, when being executed by a processor, implement the steps of the method for indicating period information of a CORESET of RMSI as described above.

According to an eighth aspect of the embodiments of the disclosure, a computer-readable storage medium is provided. The computer-readable storage medium may store computer instructions that, when being executed by a processor, implement the steps of the method for searching for a CORESET of RMSI as described above.

The technical solutions provided by the embodiments of the disclosure may include the following beneficial effects.

First indication information, that is configured to indicate a positional relationship between a half radio frame where a CORESET of RMSI corresponding to the SSB is located and a half radio frame where the SSB is located, is added to a PBCH of an SSB, so as to indicate period information of a CORESET of RMSI by using as few bits as possible.

The half radio frame where the CORESET of the RMSI is located is obtained according to the half radio frame where the SSB is located and the first indication information carried in the received SSB, and the CORESET of the RMSI is searched for in the half radio frame where the CORESET of the RMSI is located. The entire implementation process takes fewer bits to indicate the period information of the CORESET of the RMSI, resulting in the frequency of a UE searching for the half radio frame where the CORESET of the RMSI is located to be reduced, thereby improving the search efficiency of the CORESET of the RMSI.

It is to be understood that the above general description and detailed description below are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
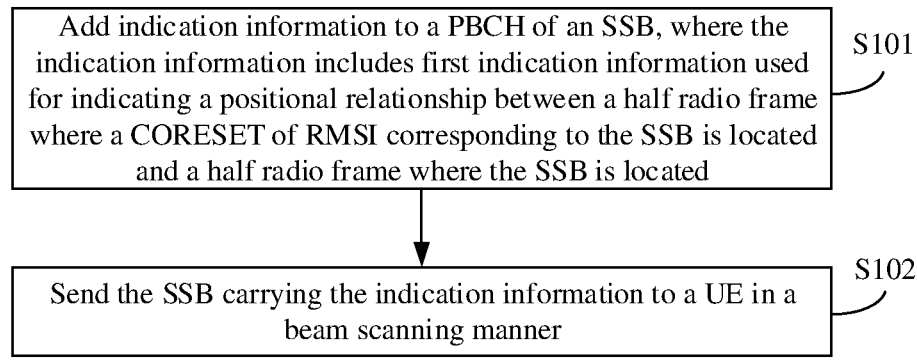
FIG. 1 is a flowchart showing a method for indicating period information of a CORESET of RMSI according to an exemplary embodiment of the disclosure.

FIG. 1 is a flowchart showing a method for indicating period information of a CORESET of RMSI, according to an exemplary embodiment of the disclosure. This embodiment is described from a base station side. As shown in FIG. 1, the method for indicating period information of a CORESET of RMSI includes the following steps.

In step S101, indication information is added to a PBCH of an SSB. The indication information includes first indication information configured to indicate a positional relationship between a half radio frame where a CORESET of RMSI corresponding to the SSB is located and a half radio frame where the SSB is located.

The SSB may be an SS Block or a PBCH Block. The first indication information may occupy different bits, for example, may occupy one bit or two bits.

In this embodiment, for periods of a CORESET of RMSI that have different magnitudes or sizes, the first indication information having the same content may represent different meanings. For example, if a value of a period of the CORESET of the RMSI is 10 milliseconds (ms) and the first indication information occupies one bit, when a value of the bit is 0, it may indicate that the SSB and the CORESET of the RMSI corresponding to the SSB are located in the same half radio frame. When the value of bit is 1, it may indicate that the CORESET of the RMSI corresponding to the SSB is located in a next half radio frame to that of the SSB. For example, if a value of the period of the CORESET of the RMSI is 20 ms and the first indication information occupies one bit, when the value of the bit is 0, it may indicate that the SSB is located in a current half radio frame, and the CORESET of the RMSI corresponding to the SSB is located in a next half radio frame. When the value of the bit is 1, it may indicate that the SSB is located in the $(n+2)^{th}$ half radio frame and the CORESET of the RMSI corresponding to the SSB is located in the $(n+3)^{th}$ half radio frame.

In addition, for periods of a CORESET of RMSI that have the same magnitude, a positional relationship between the half radio frame where the CORESET of the RMSI corresponding to the SSB is located and the half radio frame where the SSB is located may be represented by first indication information occupying different bits. For example, the positional relationship therebetween may be represented by the first indication information of 1 bit. The positional relationship therebetween may be represented by the first indication information of 2 bits. The use of the first indication information of 2 bits may increase the flexibility of indication.

In this embodiment, the indication information may further include second indication information configured to indicate a magnitude relationship between a value of a period of the CORESET of the RMSI and a value of a period of the SSB. The value of the period of the CORESET of the RMSI is greater than or equal to the value of the period of the SSB (a maximum period value of the CORESET of the RMSI does not exceed 320 ms), and there is a certain relationship between the value of the period of the CORESET of the RMSI and the value of the period of the SSB. For example, Table 1 shows a correspondence between multiple period values of a CORESET of RMSI and multiple period values of an SSB.

TABLE 1

| Correspondence between period of CORESET of RMSI and period of SSB | | | | |
|---|---|---|---|---|
| Period of SSB | Period of CORESET of RMSI (ms) | | | |
| (ms) | 00 | 01 | 10 | 11 |
| 5 | 5 | 10 | 20 | 40 |
| 10 | 10 | 20 | 40 | 80 |
| 20 | 20 | 40 | 80 | 160 |

TABLE 1-continued

| Correspondence between period of CORESET of RMSI and period of SSB | | | | |
|---|---|---|---|---|
| Period of SSB | Period of CORESET of RMSI (ms) | | | |
| (ms) | 00 | 01 | 10 | 11 |
| 40 | 40 | 80 | 160 | 320 |
| 80 | 80 | 160 | 320 | X |

It can be seen from Table 1 that the period of the CORESET of the RMSI may be 1, 2, 4, or 8 times the value of the period of the SSB. Therefore, the second indication information may be represented by 2 bits, and fewer bits are used.

In addition, in this embodiment, the period information of the CORESET of the RMSI may include a positional relationship between the half radio frame where the CORESET of the RMSI is located and the half radio frame where the corresponding SSB is located, and the value of the period of the CORESET of the RMSI.

In step S102, the SSB carrying the indication information is sent to a UE in a beam scanning manner.

In this embodiment, after the indication information is added to the PBCH of the SSB, the SSB carrying the indication information may be sent to a UE in a beam scanning manner.

In the foregoing embodiment, first indication information, that is configured to indicate a positional relationship between a half radio frame where a CORESET of RMSI corresponding to the SSB is located and a half radio frame where the SSB is located, is added to a PBCH of an SSB, so as to indicate period information of a CORESET of RMSI by using as few bits as possible.

Figure 2:
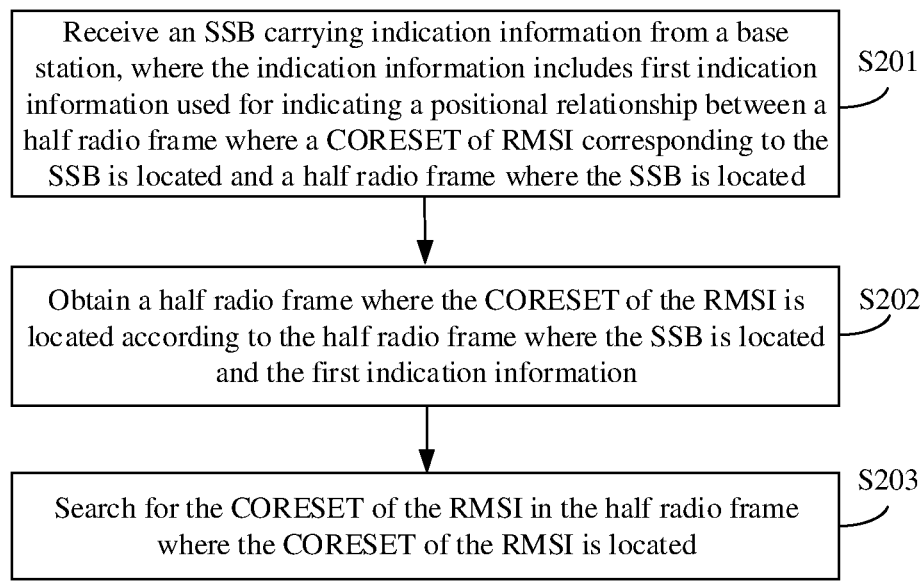
FIG. 2 is a flowchart showing a method for searching for a CORESET of RMSI, according to an exemplary embodiment of the disclosure.

FIG. 2 is a flowchart showing a method for searching for a CORESET of RMSI, according to an exemplary embodiment of the disclosure. This embodiment is described from a UE side. As shown in FIG. 2, the method for searching for a CORESET of RMSI includes the following steps.

In step S201, an SSB carrying indication information sent by a base station is received by the UE. The indication information includes first indication information configured to indicate a positional relationship between a half radio frame where a CORESET of RMSI corresponding to the SSB is located and a half radio frame where the SSB is located.

The first indication information may occupy different bits, for example, one or two bits.

In this embodiment, the indication information may further include second indication information configured to indicate a magnitude relationship between a value of a period of the CORESET of the RMSI and a value of a period of the SSB.

In step S202, a half radio frame where the CORESET of the RMSI is located is obtained by the UE according to a half radio frame where the SSB is located and the first indication information.

In this embodiment, if the indication information further includes second indication information, the UE firstly obtains the value of the period of the CORESET of the RMSI according to the value of the period of the SSB and the second indication information, and then obtains the half radio frame where the CORESET of the RMSI is located according to the half radio frame where the SSB is located and the first indication information.

Because the second indication information occupies fewer bits, the period of the CORESET of the RMSI can be obtained by using a fewer number of times.

In step S203, the CORESET of the RMSI is searched for in the half radio frame where the CORESET of the RMSI is located.

After the UE obtains the half radio frame where the CORESET of the RMSI is located, the UE may search for or find the CORESET of the RMSI in the half radio frame where the CORESET of the RMSI is located.

In the foregoing embodiment, the half radio frame where the CORESET of the RMSI is located is obtained according to the half radio frame where the SSB is located and the first indication information carried in the received SSB, and the CORESET of the RMSI is searched for in the half radio frame where the CORESET of the RMSI is located. The entire implementation process realizes indication of the period information of the CORESET of the RMSI by using fewer bits, resulting in the frequency of a UE searching for the half radio frame where the CORESET of the RMSI is located to be reduced, thereby improving the search efficiency of the CORESET of the RMSI.

Figure 3:
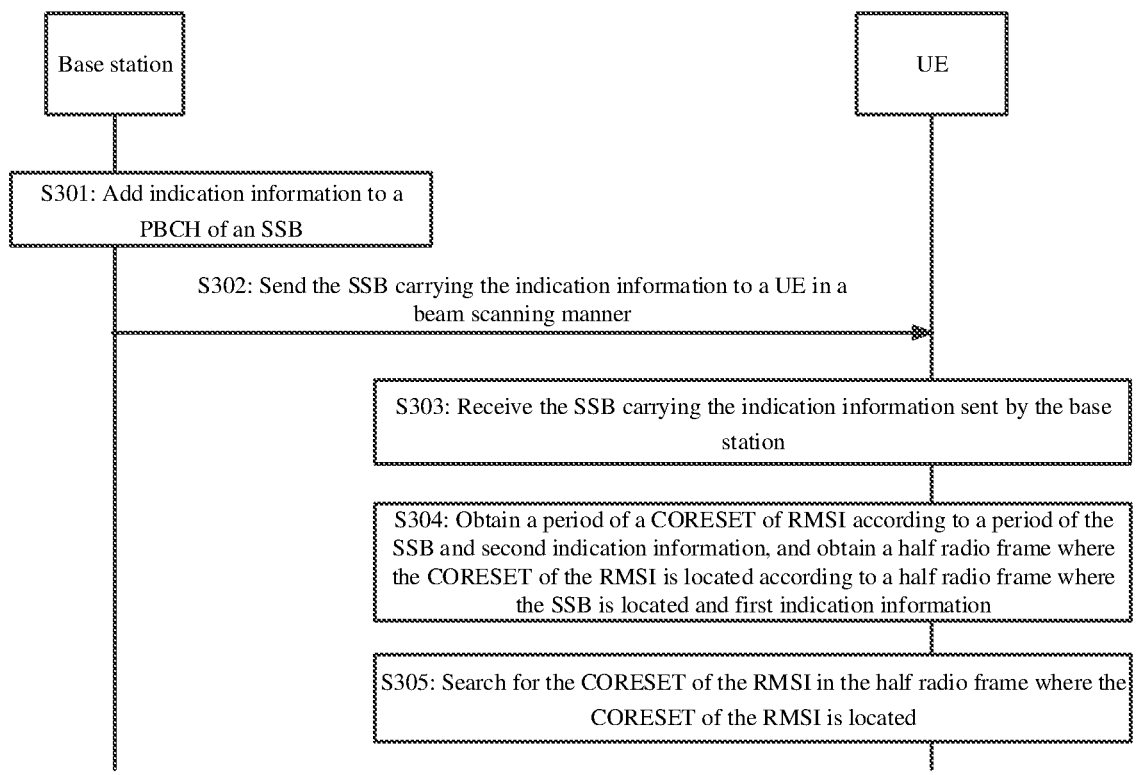
FIG. 3 is a signaling flowchart showing a method for searching for a CORESET of RMSI, according to an exemplary embodiment of the disclosure.

FIG. 3 is a signaling flowchart showing a method for searching for a CORESET of RMSI, according to an exemplary embodiment of the disclosure. This embodiment is described on the basis of interaction between a base station and UE. As shown in FIG. 3, the method includes the following steps.

In step S301, the base station adds indication information to a PBCH of an SSB. The indication information includes first indication information and second indication information. The first indication information is configured to indicate a positional relationship between a half radio frame where a CORESET of RMSI corresponding to the SSB is located and a half radio frame where the SSB is located. The second indication information is configured to indicate a magnitude relationship between a value of a period of the CORESET of the RMSI and a value of a period of the SSB.

In step S302, the base station sends the SSB carrying the indication information to the UE in a beam scanning manner.

In step S303, the UE receives the SSB carrying the indication information sent by the base station.

In step S304, the UE obtains the period of a CORESET of RMSI according to the period of the SSB and the second indication information, and obtains the half radio frame where the CORESET of the RMSI is located according to the half radio frame where the SSB is located and the first indication information.

In step S305, the UE searches for the CORESET of the RMSI in the half radio frame where the CORESET of the RMSI is located.

In the foregoing embodiment, through interaction between the base station and the UE, the period information of the CORESET of the RMSI can be indicated by using as few bits as possible, and the search efficiency for the CORESET of the RMSI can be improved.

Figure 4:
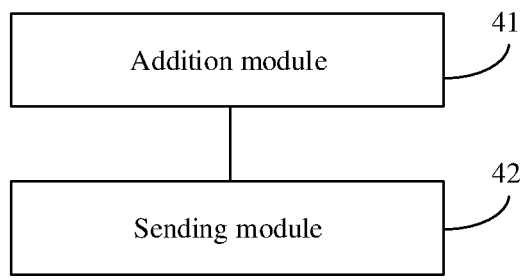
FIG. 4 is a block diagram illustrating a device for indicating period information of a CORESET of RMSI, according to an exemplary embodiment.

FIG. 4 is a block diagram illustrating a device for indicating period information of a CORESET of RMSI, according to an exemplary embodiment. The device may be located in a base station. As shown in FIG. 4, the device includes an addition module 41 and a sending module 42.

The addition module 41 is configured to add indication information to a PBCH of an SSB. The indication information includes first indication information configured to indicate a positional relationship between a half radio frame where a CORESET of RMSI corresponding to the SSB is located and a half radio frame where the SSB is located.

The first indication information may occupy different bits, for example, may occupy one bit or two bits.

In this embodiment, for periods of a CORESET of RMSI that have different magnitudes, the first indication information having the same content may represent different meanings. For example, if a value of a period of the CORESET of the RMSI is 10 milliseconds (ms) and the first indication information occupies one bit, when the value of the bit is 0, it may indicate that the SSB and the CORESET of the RMSI corresponding to the SSB are located in the same half radio frame. When the value of the bit is 1, it may indicate that the CORESET of the RMSI corresponding to the SSB is located in a next half radio frame to that of the SSB. For example, if the value of the period of the CORESET of the RMSI is 20 milliseconds (ms) and the first indication information occupies one bit, when the value of the bit is 0, it may indicate that the SSB is located in a current half radio frame, and the CORESET of the RMSI corresponding to the SSB is located in a next half radio frame. When the value of the bit is 1, it may indicate that the SSB is located in an $(n+2)^{th}$ half radio frame and the CORESET of the RMSI corresponding to the SSB is located in an $(n+3)^{th}$ half radio frame.

In addition, for periods of a CORESET of RMSI that have the same magnitude, a positional relationship between the half radio frame where the CORESET of the RMSI corresponding to the SSB is located and the half radio frame where the SSB is located may be represented by first indication information occupying different bits. For example, the positional relationship therebetween may be represented by the first indication information of 1 bit. The positional relationship therebetween may be represented by the first indication information of 2 bits. The use of the first indication information of 2 bits may increase the flexibility of indication.

In this embodiment, the indication information may further include second indication information configured to indicate a magnitude relationship between the value of the period of the CORESET of the RMSI and the value of the period of the SSB. The value of the period of the CORESET of the RMSI is greater than or equal to the value of the period of the SSB (a maximum period value of the CORESET of the RMSI does not exceed 320 ms), and there is a certain relationship between the value of the period of the CORESET of the RMSI and the value of the period of the SSB. For example, Table 1 shows a correspondence between multiple period values of a CORESET of RMSI and multiple period values of an SSB.

It can be seen from Table 1 that the period of the CORESET of the RMSI may be 1, 2, 4, or 8 times the period of the SSB. Therefore, the second indication information may be represented by 2 bits, and fewer bits are used.

In addition, in this embodiment, the period information of the CORESET of the RMSI may include a positional relationship between the half radio frame where the CORESET of the RMSI is located and the half radio frame where the corresponding SSB is located, and the period of the CORESET of the RMSI.

The sending module 42 is configured to send, in a beam scanning manner, the SSB carrying the indication information added by the addition module 41 to a UE.

In this embodiment, after the indication information is added to the PBCH of the SSB, the SSB carrying the indication information may be sent to a UE in a beam scanning manner.

In the foregoing embodiment, first indication information, that is configured to indicate a positional relationship between a half radio frame where a CORESET of RMSI corresponding to the SSB is located and a half radio frame where the SSB is located, is added to a PBCH of an SSB, so as to indicate period information of a CORESET of RMSI by using as few bits as possible.

Figure 5:
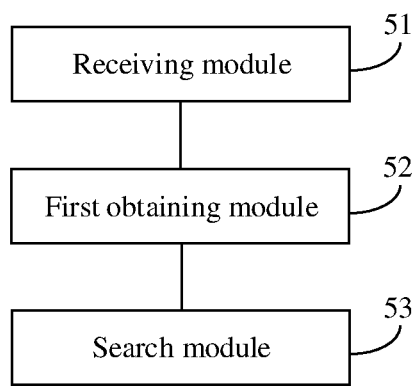
FIG. 5 is a block diagram illustrating a device for searching for a CORESET of RMSI, according to an exemplary embodiment.

FIG. 5 is a block diagram illustrating a device for searching for a CORESET of RMSI, according to an exemplary embodiment. The device may be applied in a UE. As shown in FIG. 5, the device includes a receiving module 51, a first obtaining module 52 and a search module 53.

The receiving module 51 is configured to receive an SSB carrying indication information sent by a base station. The indication information includes first indication information configured to indicate a positional relationship between a half radio frame where a CORESET of RMSI corresponding to the SSB is located and a half radio frame where the SSB is located.

The first indication information may occupy different bits, for example, may occupy one bit or two bits.

In this embodiment, the indication information may further include second indication information configured to indicate a magnitude relationship between a value of a period of the CORESET of the RMSI and a value of a period of the SSB.

The first obtaining module 52 is configured to obtain, according to a half radio frame where the SSB is located and the first indication information carried in the SSB received by the receiving module 51, a half radio frame where the CORESET of the RMSI is located.

The search module 53 is configured to search for the CORESET of the RMSI in the half radio frame where the CORESET of the RMSI obtained by the first obtaining module 52 is located.

After the UE obtains the half radio frame where the CORESET of the RMSI is located, the UE may search for the CORESET of the RMSI in the half radio frame where the CORESET of the RMSI is located.

In the foregoing embodiment, the half radio frame where the CORESET of the RMSI is located is obtained according to the half radio frame where the SSB is located and the first indication information carried in the received SSB, and the CORESET of the RMSI is searched in the half radio frame where the CORESET of the RMSI is located. The entire implementation process realizes indication of the period information of the CORESET of the RMSI by using fewer bits, resulting in the frequency of a UE searching for the half radio frame where the CORESET of the RMSI is located, thereby improving the search efficiency of the CORESET of the RMSI.

Figure 6:
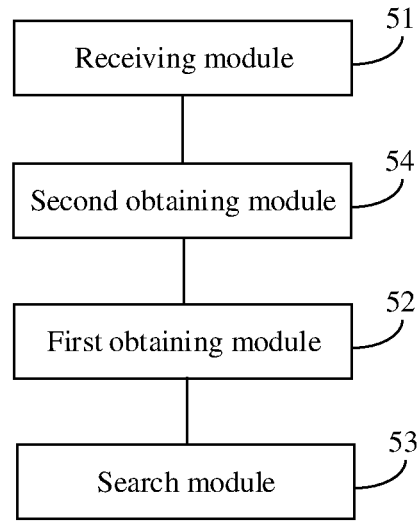
FIG. 6 is a block diagram illustrating another device for searching for a CORESET of RMSI, according to an exemplary embodiment.

FIG. 6 is a block diagram illustrating another device for searching for a CORESET of RMSI, according to an exemplary embodiment. As shown in FIG. 6, on the basis of the foregoing embodiment shown in FIG. 5, the device may further include a second obtaining module 54.

The second obtaining module 54 is configured to obtain, before the first obtaining module 52 obtains the half radio frame where the CORESET of the RMSI is located according to the half radio frame where the SSB is located and the first indication information, a value of a period of the CORESET of the RMSI according to a value of a period of the SSB and the second indication information.

In this embodiment, if the indication information further includes second indication information, the UE firstly obtains the period of the CORESET of the RMSI according to the period of the SSB and the second indication information, and then obtains the half radio frame where the CORESET of the RMSI is located according to the half radio frame where the SSB is located and the first indication information.

In the foregoing embodiment, the period of the CORESET of the RMSI is obtained according to the period of the SSB and the second indication information. Since the second indication information occupies few bits, it takes a fewer number of times to obtain the period of the CORESET of the RMSI.

Figure 7:
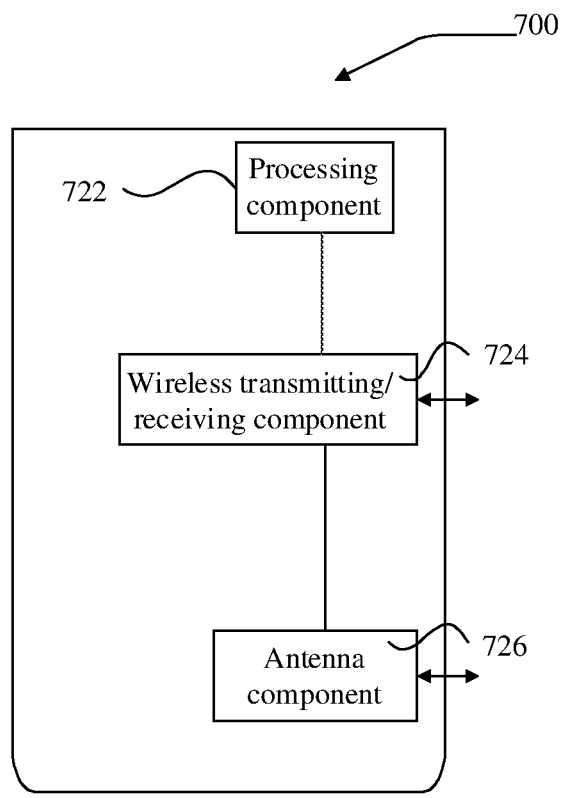
FIG. 7 is a block diagram illustrating a device suitable for indicating period information of a CORESET of RMSI, according to an exemplary embodiment.

FIG. 7 is a block diagram illustrating a device for indicating period information of a CORESET of RMSI, according to an exemplary embodiment. A device 700 may be provided as a base station. Referring to FIG. 7, the device 700 includes a processing component 722, a wireless transmitting/receiving component 724, an antenna component 726, and a wireless interface-specific signal processing portion. The processing component 722 may further include one or more processors.

One of the processors in the processing component 722 may be configured to:

add indication information to a PBCH of an SSB, the indication information including first indication information configured to indicate a positional relationship between a half radio frame where a CORESET of RMSI corresponding to the SSB is located and a half radio frame where the SSB is located; and send, in a beam scanning manner, the SSB carrying the indication information to a UE.

In some embodiments, there is also provided a non-transitory computer-readable storage medium including instructions, executable by the processor 722 of the device 700 to complete the above described method for indicating period information of a CORESET of RMSI. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

Figure 8:
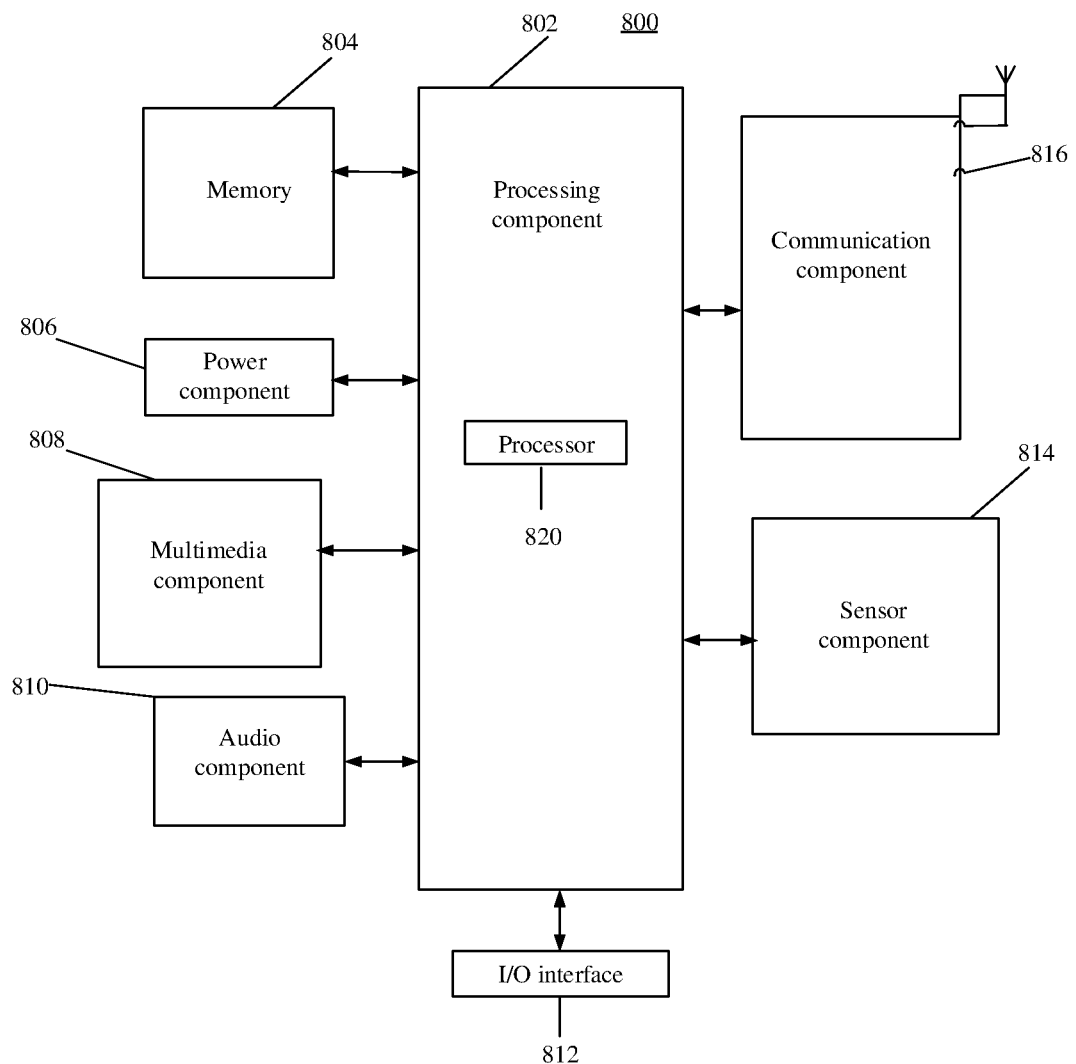
FIG. 8 is a block diagram illustrating a device for searching for a CORESET of RMSI, according to an exemplary embodiment.

FIG. 8 is a block diagram illustrating a device for indicating period information of a CORESET of RMSI, according to an exemplary embodiment. For example, a device 800 may be a UE such as a mobile phone, a computer, a digital broadcast terminal, a messaging device, a gaming console, a tablet, a medical device, exercise equipment, and a personal digital assistant.

Referring to FIG. 8, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interactions between the processing component 802 and other components. For example, the processing component 802 may include a multimedia module to facilitate the interaction between the multimedia component 808 and the processing component 802.

One of the processors 820 in the processing component 802 may be configured to:

receive an SSB carrying indication information sent by a base station, the indication information including first indication information configured to indicate a positional relationship between a half radio frame where a CORESET of RMSI corresponding to the SSB is located and a half radio frame where the SSB is located;

obtain the half radio frame where the CORESET of the RMSI is located according to the half radio frame where the SSB is located and the first indication information; and search for the CORESET of the RMSI in the half radio frame where the CORESET of the RMSI is located.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 806 provides power to various components of the device 800. The power component 806 may include: a power management system, one or more power sources, and any other components associated with the generation, management and distribution of power in the device 800.

The multimedia component 808 includes a screen providing an output interface between the device 800 and the user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a Microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, or buttons. The buttons may include, but are not limited to, a home button, a volume button, a starting button, and a locking button.

The sensor component 814 includes one or more sensors to provide status assessments of various aspects of the device 800. For example, the sensor component 814 may detect an open/closed status of the device 800, and relative positioning of components. For example, the component is the display and the keypad of the device 800. The sensor component 814 may also detect a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a Complementary Metal Oxide Semiconductor (CMOS) or Charge Coupled Device (CCD) image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate communication, wired or wirelessly, between the device 800 and other devices. The device 800 may access a wireless network based on a communication standard, such as WiFi, 2G or 3G, or a combination thereof. In one exemplary embodiment, the communication component 816 receives a broadcast signal or broadcast associated information from an external broadcast management system via a broadcast channel In one exemplary embodiment, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In some embodiments, the device 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In some embodiments, there is also provided a non-transitory computer-readable storage medium including instructions, such as being included in the memory 804, executable by the processor 820 of the device 800 to complete the above described methods. For example, the non-transitory computer-readable storage medium may be a ROM, a RAM, a CD-ROM, a magnetic tape, a floppy disc, an optical data storage device and the like.

The device embodiments substantially correspond to the method embodiments, and thus reference for related parts may be made to descriptions of the method embodiments. The device embodiment described above is only schematic. Units described as separate parts therein may or may not be physically separated. Parts displayed as units may or may not be physical units, and namely may be located in the same place or may also be distributed to a plurality of network units. Part or all of the modules therein may be selected according to a practical requirement to achieve the purpose of the solutions of the embodiments. Those of ordinary skill in the art may understand and implement without creative work.

It is to be noted that relational terms "first", "second" and the like in the disclosure are adopted only to distinguish one entity or operation from another entity or operation and not always to require or imply existence of any such practical relationship or sequence between the entities or operations. Terms "include" and "comprise" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for indicating period information of a common control resource set (CORESET) of remaining key system information (RMSI), applied to a base station, the method comprising:
adding indication information to a physical broadcast channel (PBCH) of a synchronous broadcast block (SSB), wherein the indication information comprises first indication information configured to indicate a positional relationship between a half radio frame where a CORESET of RMSI corresponding to the SSB is located and a half radio frame where the SSB is located; and
sending the SSB carrying the indication information to user equipment (UE) in a beam scanning manner,
wherein the indication information further comprises second indication information configured to indicate a magnitude relationship between a value of a period of the CORESET of the RMSI and a value of a period of the SSB.

2. The method of claim 1, wherein the first indication information occupies one bit or two bits.

3. A base station, comprising:
a processor; and
a memory storing instructions executable by the processor;
wherein the processor is configured to perform the method of claim 1.

4. The base station of claim 3, wherein the first indication information occupies one bit or two bits.

5. The method of claim 1, wherein the first indication information consists of one bit.

6. The method of claim 5, wherein for periods of the CORESET of the RMSI that have different magnitudes, the one bit of the first indication information having a same value indicates different positional relationships between the half radio frame where the CORESET of RMSI corresponding to the SSB is located and the half radio frame where the SSB is located.

7. The base station of claim 3, wherein the first indication information consists of one bit.

8. A method for searching for a common control resource set (CORESET) of remaining key system information (RMSI), applied to user equipment (UE), the method comprising:
receiving a synchronous broadcast block (SSB) carrying indication information from a base station, wherein the indication information comprises first indication information configured to indicate a positional relationship between a half radio frame where a CORESET of RMSI corresponding to the SSB is located and a half radio frame where the SSB is located;
obtaining the half radio frame where the CORESET of the RMSI is located according to the half radio frame where the SSB is located and the first indication information; and
searching for the CORESET of the RMSI in the half radio frame where the CORESET of the RMSI is located,
wherein the indication information further comprises second indication information configured to indicate a magnitude relationship between a value of a period of the CORESET of the RMSI and a value of a period of the SSB.

9. The method of claim 8, wherein the first indication information occupies one bit or two bits.

10. The method of claim 8, wherein the method comprises: before obtaining the half radio frame where the CORESET of the RMSI is located according to the half radio frame where the SSB is located and the first indication information, obtaining the value of the period of the CORESET of the RMSI according to the value of period of the SSB and the second indication information.

11. The method of claim 8, wherein the first indication information consists of one bit.

12. The method of claim 11, wherein for periods of the CORESET of the RMSI that have different magnitudes, the one bit of the first indication information having a same value indicates different positional relationships between the half radio frame where the CORESET of RMSI corresponding to the SSB is located and the half radio frame where the SSB is located.

13. User equipment (UE), comprising:
a processor; and
a memory storing instructions executable by the processor;
wherein the processor is configured to:
receive a synchronous broadcast block (SSB) carrying indication information from a base station, wherein the indication information comprises first indication information configured to indicate a positional relationship between a half radio frame where a common control resource set (CORESET) of remaining key system information (RMSI) corresponding to the SSB is located and a half radio frame where the SSB is located;
obtain the half radio frame where the CORESET of the RMSI is located according to the half radio frame where the SSB is located and the first indication information that is carried in the SSB; and
search for the CORESET of the RMSI in the half radio frame where the CORESET of the RMSI is located,
wherein the indication information further comprises second indication information configured to indicate a magnitude relationship between a value of a period of the CORESET of the RMSI and a value of a period of the SSB.

14. The UE of claim 13, wherein the first indication information occupies one bit or two bits.

15. The UE of claim 13, wherein the processor is further configured to: obtain, before obtaining the half radio frame where the CORESET of the RMSI is located according to the half radio frame where the SSB is located and the first indication information, the value of period of the CORESET of the RMSI according to the period of the SSB and the second indication information.

16. The UE of claim 13, wherein the first indication information consists of one bit.

17. The UE of claim 13, wherein for periods of the CORESET of the RMSI that have different magnitudes, the one bit of the first indication information having a same value indicates different positional relationships between the half radio frame where the CORESET of RMSI corresponding to the SSB is located and the half radio frame where the SSB is located.

* * * * *